(12) United States Patent
Rozman et al.

(10) Patent No.: US 8,446,024 B2
(45) Date of Patent: May 21, 2013

(54) ELECTRICAL MACHINES WITH INTEGRATED POWER AND CONTROL AND INCLUDING A CURRENT SOURCE INVERTER

(75) Inventors: Gregory I. Rozman, Rockford, IL (US); Jacek F. Gieras, Glastonbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 500 days.

(21) Appl. No.: 12/724,452

(22) Filed: Mar. 16, 2010

(65) Prior Publication Data

US 2011/0227340 A1 Sep. 22, 2011

(51) Int. Cl.
- *F02N 11/04* (2006.01)
- *H02K 23/52* (2006.01)
- *H02P 9/04* (2006.01)

(52) U.S. Cl.
USPC .......................................................... 290/31

(58) Field of Classification Search
USPC .............. 290/31, 34, 40 A, 40 B, 40 C, 38 R, 290/46, 7
See application file for complete search history.

(56) References Cited

U.S. PATENT DOCUMENTS

| | | | |
|---|---|---|---|
| 5,491,370 A | 2/1996 | Schneider et al. | |
| 6,084,786 A * | 7/2000 | Rozman | 363/48 |
| 6,838,778 B1 | 1/2005 | Kandil et al. | |
| 6,838,779 B1 | 1/2005 | Kandil et al. | |
| 7,109,681 B2 | 9/2006 | Baker et al. | |
| 7,253,535 B2 | 8/2007 | Duesterhoeft | |
| 7,400,117 B1 * | 7/2008 | Rozman et al. | 322/45 |
| 7,501,799 B2 * | 3/2009 | Rozman et al. | 322/46 |
| 7,963,353 B2 | 6/2011 | Tatematsu et al. | |
| 2007/0030706 A1 | 2/2007 | Wei et al. | |
| 2007/0030707 A1 | 2/2007 | Wei et al. | |
| 2008/0111420 A1 | 5/2008 | Anghel et al. | |
| 2009/0008993 A1 * | 1/2009 | Rozman et al. | 307/16 |
| 2009/0009146 A1 * | 1/2009 | Rozman et al. | 322/27 |
| 2009/0128083 A1 | 5/2009 | Zargari | |
| 2009/0242286 A1 | 10/2009 | Tatematsu et al. | |

OTHER PUBLICATIONS

Bin Wu, Shashi Diwan, Goordon Slemon, "PWM—CSI Inverter for Induction Motor Drives," IEEE Trans. Industry Applications, vol. 1A-28, No. 1, pp. 64-71 1992.
J.H. Zhao, et al., the First 4H-SiC BJT-based 20 kHz, 7HP PWM DC-to-AC Inverter for Induction Motor Control Applications, pp. 1-4.
M. Mohr, et al., "Dimensioning of a Current Source Inverter for the Feed-in of Electrical Energy from Fuel Cells to the Mains", pp. 1-7.

* cited by examiner

*Primary Examiner* — Javaid Nasri
(74) *Attorney, Agent, or Firm* — Carlson, Gaskey & Olds

(57) ABSTRACT

A machine has a housing that includes a plurality of stator coils to be positioned adjacent to a rotor. A switching network includes a plurality of transistors and diodes connected to the coils. A current source inverter is provided by a switching network, a pair of inductors positioned on power rails, and commutating capacitors. The current source inverter and the coils are all positioned within the housing. Power architecture for a vehicle has a source of DC power, which communicates with machines through integrated motor drives. The motor drives include at least three coils positioned adjacent to the rotors for a motor associated with the integrated motor drive. A storage switching network is positioned downstream of the coils, with the storage switching network to be closed to allow power from the coils to drive the rotor, or to be opened to allow power to pass to a local storage component.

15 Claims, 6 Drawing Sheets

ELECTRICAL MACHINES WITH INTEGRATED POWER AND CONTROL AND INCLUDING A CURRENT SOURCE INVERTER

BACKGROUND

This application relates to an electrical machine that may be a starter/generator, or may be a motor drive, and wherein power switches are integrated with motor coils, with a current source inverter positioned between a power source and a machine. The application also relates to unique power supply architecture for use on a vehicle such as an aircraft.

Electrical machines are known, and will include a plurality of coils. The electrical machine can operate as a motor or as a generator. A switching network including a plurality of transistors and diodes is positioned to be in series with the coils. It is known to integrate the switching network and the coils within a single housing that offers benefits discussed above.

In the past, such machines have been provided with a voltage source inverter. A voltage source inverter typically includes a DC link capacitor, as an energy storage device. When such a capacitor is incorporated within the housing packaging problems arise due to large size and sensitivity to temperature and current ripple on a DC bus.

Integration of an electrical machine and a motor drive into a single housing eliminates long cables between a motor and motor drive, eliminates standing voltage waves between the motor and motor drive, and reduces or eliminates a filter at the motor drive output.

Progress is made by integrating an electrical machine and a voltage source inverter (VSI). However, a VSI has undesirable characteristics including a need for a large size DC link capacitor, as an energy storage device, and shoot-through concerns. Integration of a VSI with the motor housing can be significantly improved by utilizing silicon carbide (SiC) power semiconductors such as SiC MOSFETs, SiC JFETs, SiC BJTs and SiC Schottky diodes. High temperature SiC devices can simplify cooling arrangements.

However, the use of a DC link capacitor in a VSI creates packaging challenges due to its large size, and sensitivity to operating temperature and current ripple on DC bus. Film capacitor ripple current rapidly decreases with temperature. Other drawbacks of a VSI are associated with the pulse-width modulated voltage waveforms resulting in high electromagnetic interference (EMI) noise, bearing-leakage currents, and high stress on motor insulation.

Current source inverters are known, and rely upon a DC link inductor as an energy storage device. However, such current source inverters have not been incorporated into a housing with a switching network and motor drive coils as mentioned above.

SUMMARY

A machine has a housing that includes a plurality of stator coils. The stator coils are to be positioned adjacent to a rotor. A switching network includes a plurality of power transistors and diodes connected to the coils. A current source inverter includes a switching network, a pair of inductors positioned on positive and negative power rails, and a set of commutating capacitors. The pair of inductors, the switching network, a set of commutating capacitors and the coils are all positioned within said housing.

In a separate feature, power architecture for a vehicle has a source of DC power, which communicates with a plurality of machines through integrated motor drives. The motor drives include at least three coils positioned adjacent to the rotors for a motor associated with the integrated motor drive. A storage switching network is positioned downstream of the coils, with the storage switching network to be closed to allow power from the coils to drive the rotor, or to be opened to allow power to no longer drive the rotor but instead pass to a local storage component.

These and other features of the present invention can be best understood from the following specification and drawings, the following of which is a brief description.

DETAILED DESCRIPTION

Figure 1:
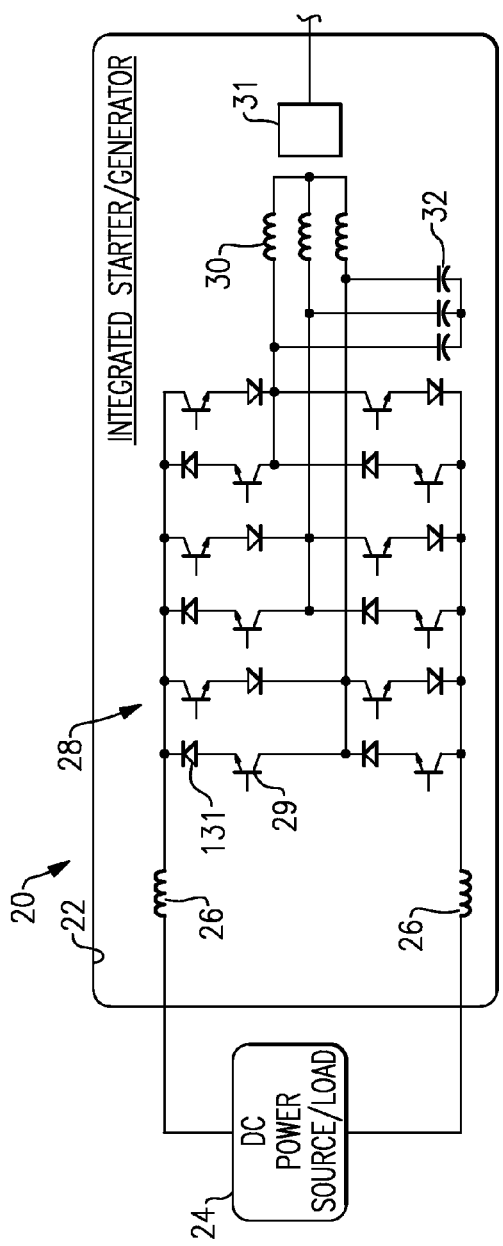
FIG. 1 shows an integrated starter/generator.

A starter/generator circuit 20 is illustrated in FIG. 1. A housing 22, shown schematically, is positioned to be connected to a DC power source, or load 24.

A current source inverter provided by inductors 26 connects the DC power source/load 24 to a switching network 28 provided with a plurality of transistor switches 29 and diodes 131. Small commutating capacitors 32 are connected to the network 28.

Stator coils 30 are connected downstream of the capacitors 32 and positioned adjacent a rotor 31.

Figure 2:
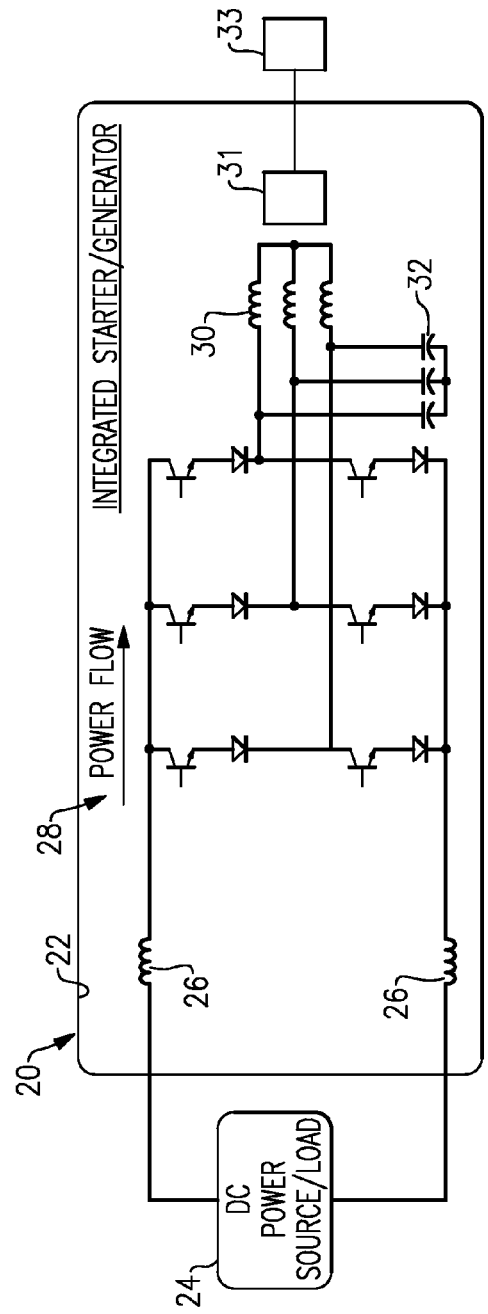
FIG. 2 shows a power flow in the FIG. 1 starter/generator during engine start.

FIG. 2 shows the circuit 20 operating in a start mode. Power from the DC power source 24 passes across the inverter inductors 26, through the switching network 28, and powers the coils 30. This in turn drives rotor 31, shown schematically. In one embodiment, the rotor 31 could be connected to a gas turbine engine 33.

Figure 3:
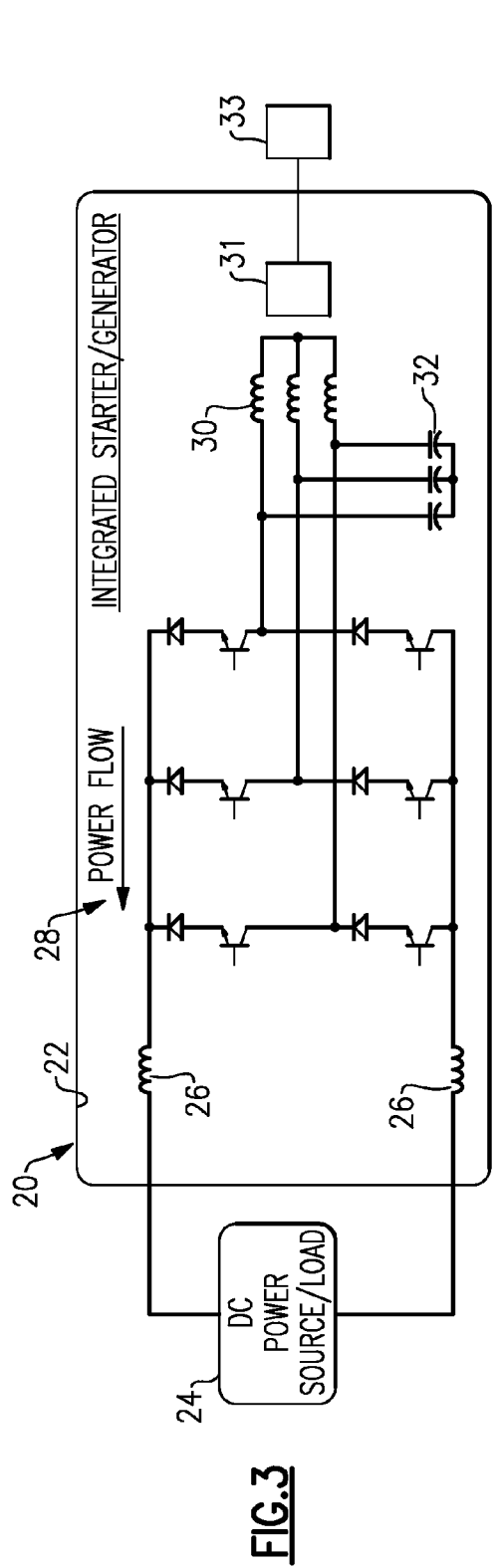
FIG. 3 shows the power flow of the FIG. 1 starter/generator during a generation mode.

FIG. 3 shows the circuit 20 operating in a power generating mode. At this point, the engine 33 is driven to rotate, and in turn drives the rotor 31. This then generates power flow back through the switching network 28 to provide power to the DC power source/load 24.

Incorporating the current source inverter and inductor 26 within the motor housing 22 provides packaging benefits as mentioned above.

Figure 4:
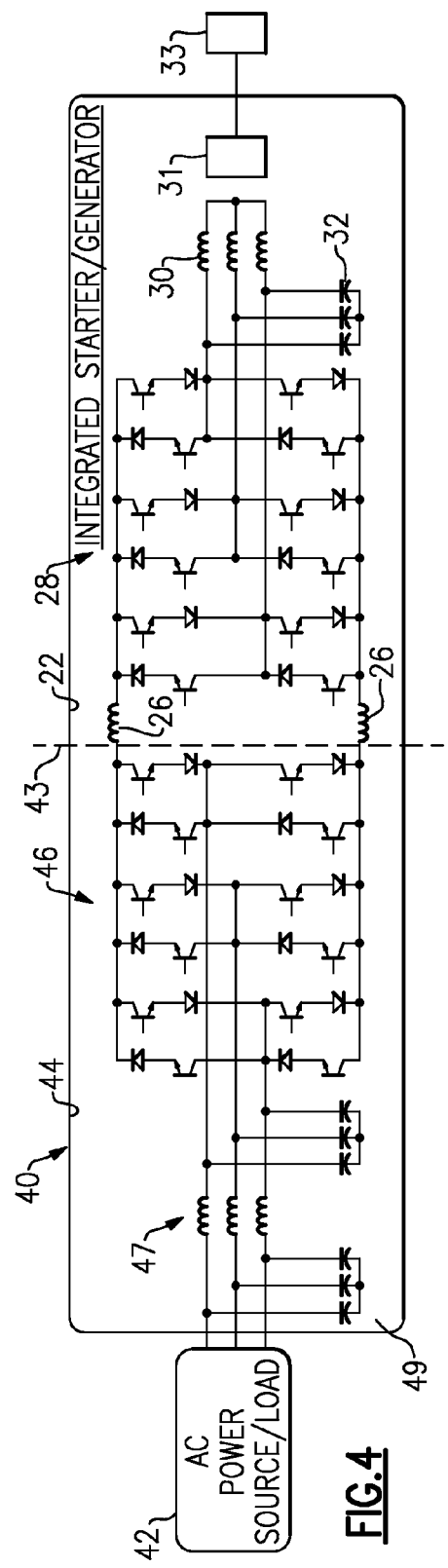
FIG. 4 shows a topology of an AC power source combined with a starter/generator as shown in FIG. 1.

FIG. 4 shows a circuit 40 wherein the housing 44 further incorporates a switching network 46 comprising a plurality of diodes, transistors, inductors 47, and commutating capacitors 49, all within the housing 44. To the right of the break line 43 is a circuit which may be identical to the circuitry shown within the housing 22 in FIGS. 1-3. Notably, break line 43 is simply included for the sake of illustration, and may not exist physically within the circuit.

Figure 5:
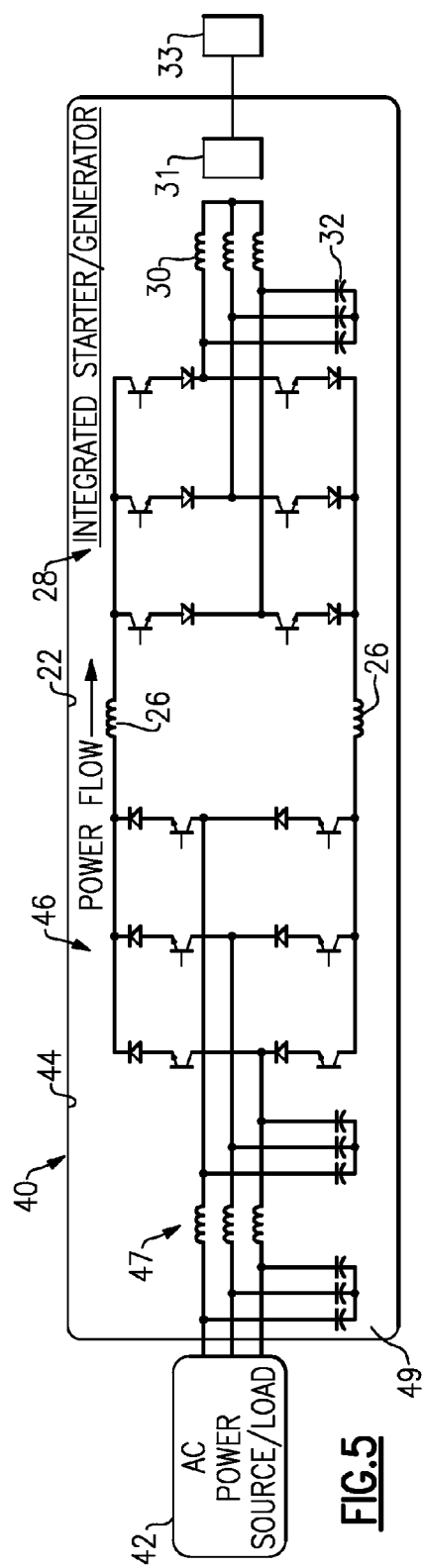
FIG. 5 shows the FIG. 4 starter/generator during engine start.
Figure 6:
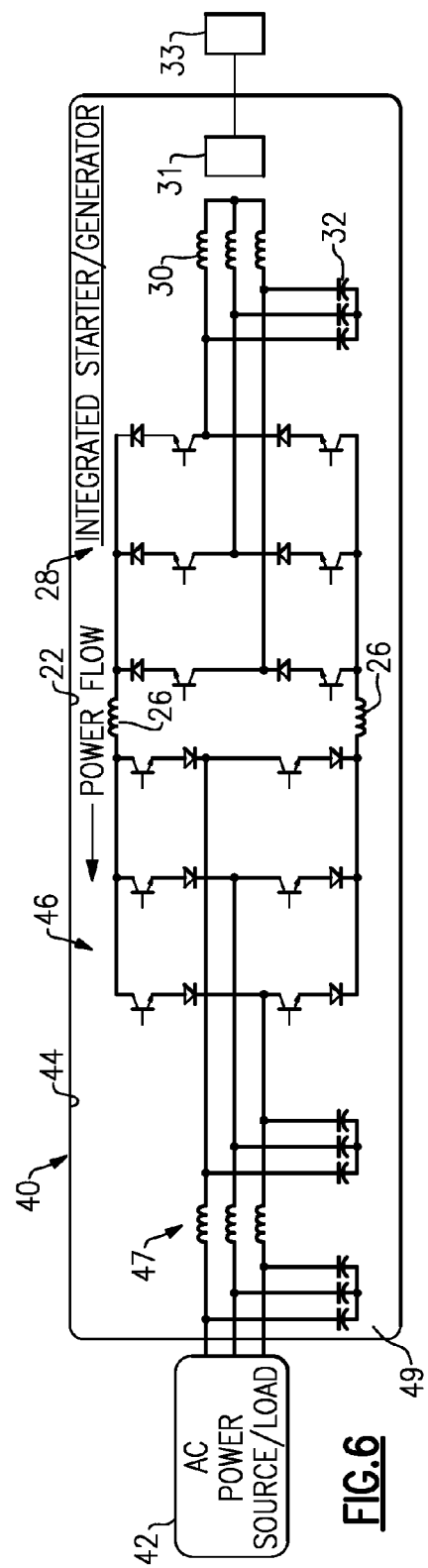
FIG. 6 shows the FIG. 4 starter/generator during generating mode.

An AC power source/load 42 is connected to the inductors 47. AC power is converted to DC by the switching network 46 and inductors 47 during start mode, and DC power is converted into AC power during generating mode. This effectively provides a current source active rectifier. FIG. 5 shows the circuit 40 during engine start mode, while FIG. 6 shows the power flow during generating mode.

Figure 7:
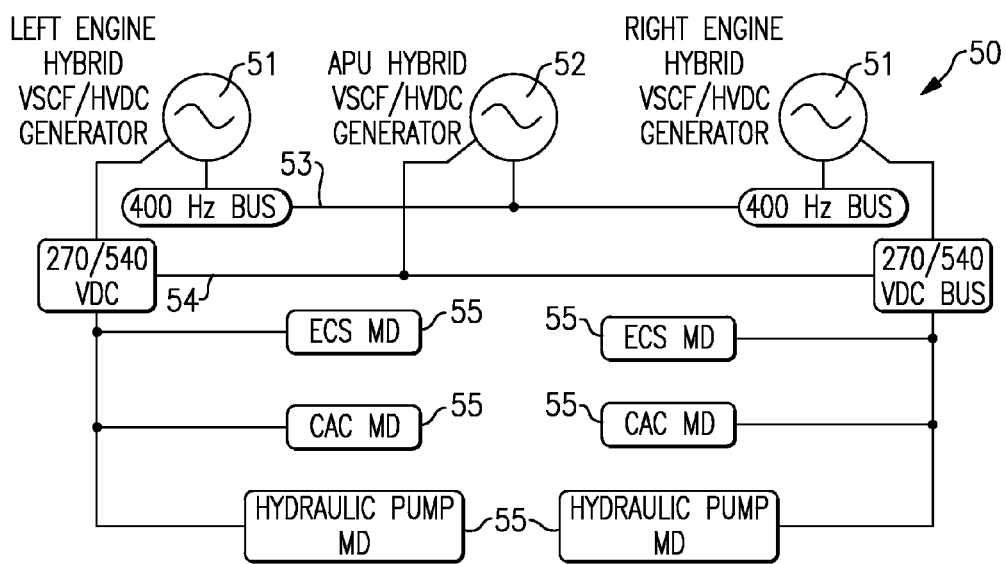
FIG. 7 shows a single line architecture for an aircraft power system.

FIG. 7 shows a single line architecture 50 which is now available to provide power on an aircraft with the inventive circuits 20 or 40 of FIGS. 1 and 4. Gas turbine engines are connected to an integrated starter/generator 51, which may be as shown at 20 or 40 in the earlier Figures. An auxiliary power unit is connected to an integrated starter/generator 52. Again, this may be structured as at 20 or 40. There is an AC bus 53 and a DC bus 54. A plurality of components 55 may include environmental control system (ECS) motor drives (MDs), cabin air compressor (CAC) MDs, and hydraulic pump MDs are connected to be driven by this system.

Figure 8:
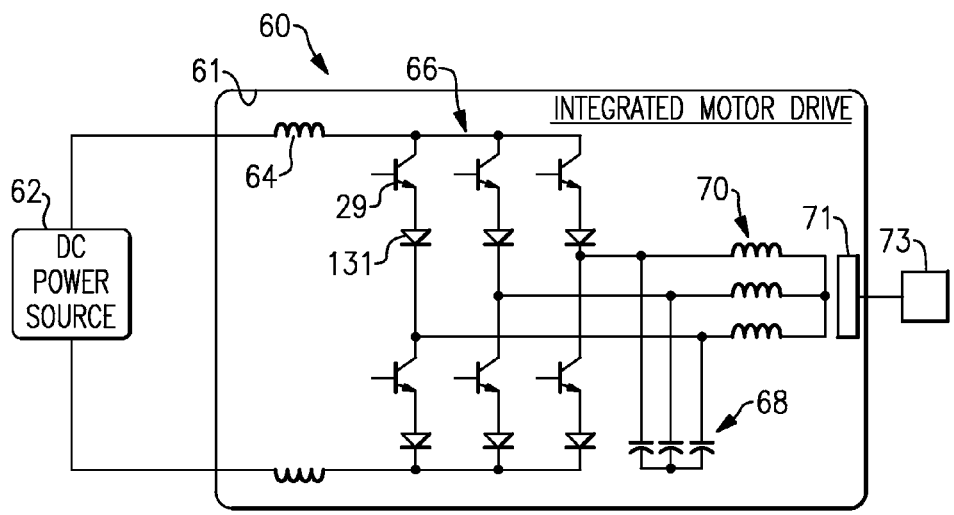
FIG. 8 shows an integrated motor drive.

An integrated motor drive 60 having a housing 61 is illustrated in FIG. 8. Again, a DC power source 62 is connected through inductors 64, a switching network 66, and power drive coils 70 for driving a motor rotor 71. The motor rotor 71 can be utilized to drive any number of components 73. Commutating capacitors 68 are provided as an earlier embodiment.

Figure 9:
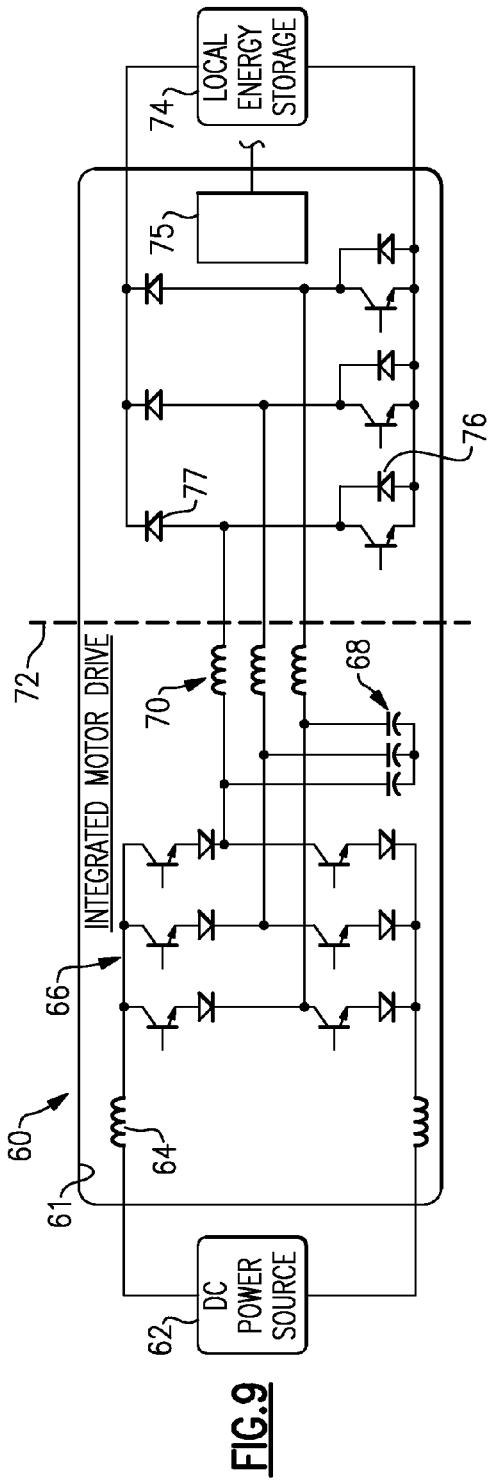
FIG. 9 shows an integrated motor drive provided with a three-phase modified diode bridge.

FIG. 9 shows the integrated motor drive 60 of FIG. 8 to the left of break line 72. Notably, break line 72 is simply included for the sake of illustration, and may not exist physically within the circuit. The switches 76 are operable to turn on and off. When closed, they allow power from the integrated motor drive 60 to power a motor rotor 75. However, this embodiment is operable to store energy in a local energy storage component 74. The local energy storage component 74 can be any type of energy storage member. In this embodiment, when the switches 76 are all open, power passes through the diodes 77 and is stored in the local energy storage component 74.

Figure 10:
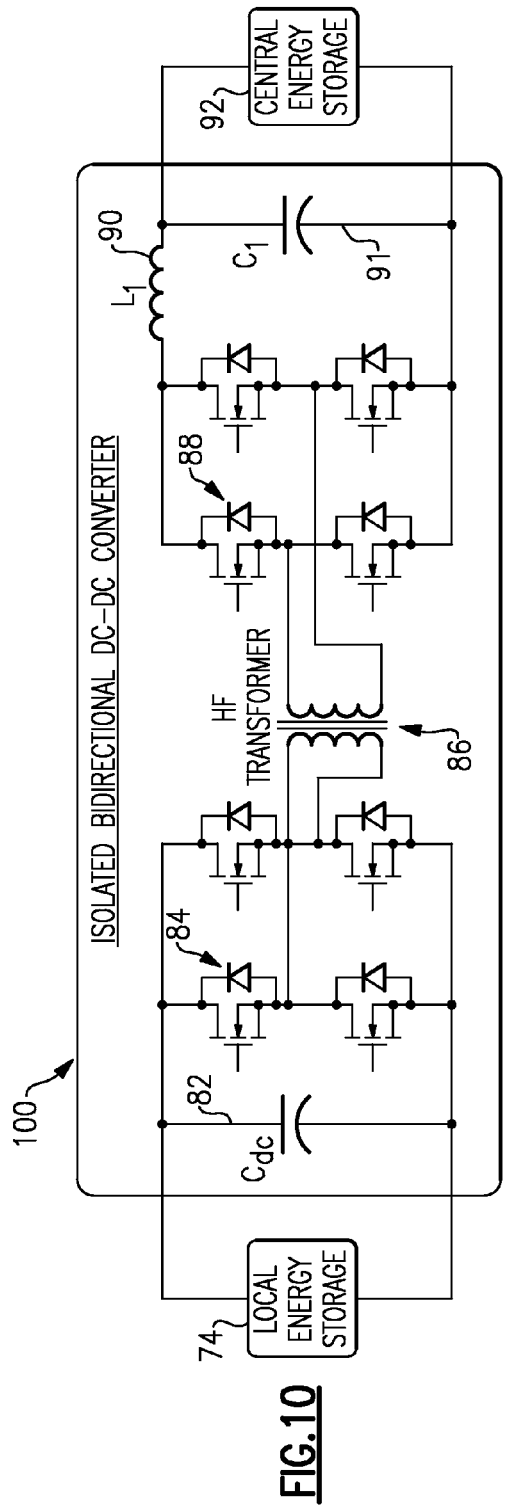
FIG. 10 shows an interface between local and central energy storage.

As shown in FIG. 10, the local energy storage component 74 can be provided with an isolated bi-directional DC to DC converter 100 including capacitor 82, switching network 84, a transformer 86 for galvanic isolation, switching network 88, inductor 90, and capacitor 91. All of this allows the local energy storage component 74 to pass on power for storage at a central energy storage component 92. Again, the central energy storage component 92 can be any appropriate type of energy storage system.

Figure 11:
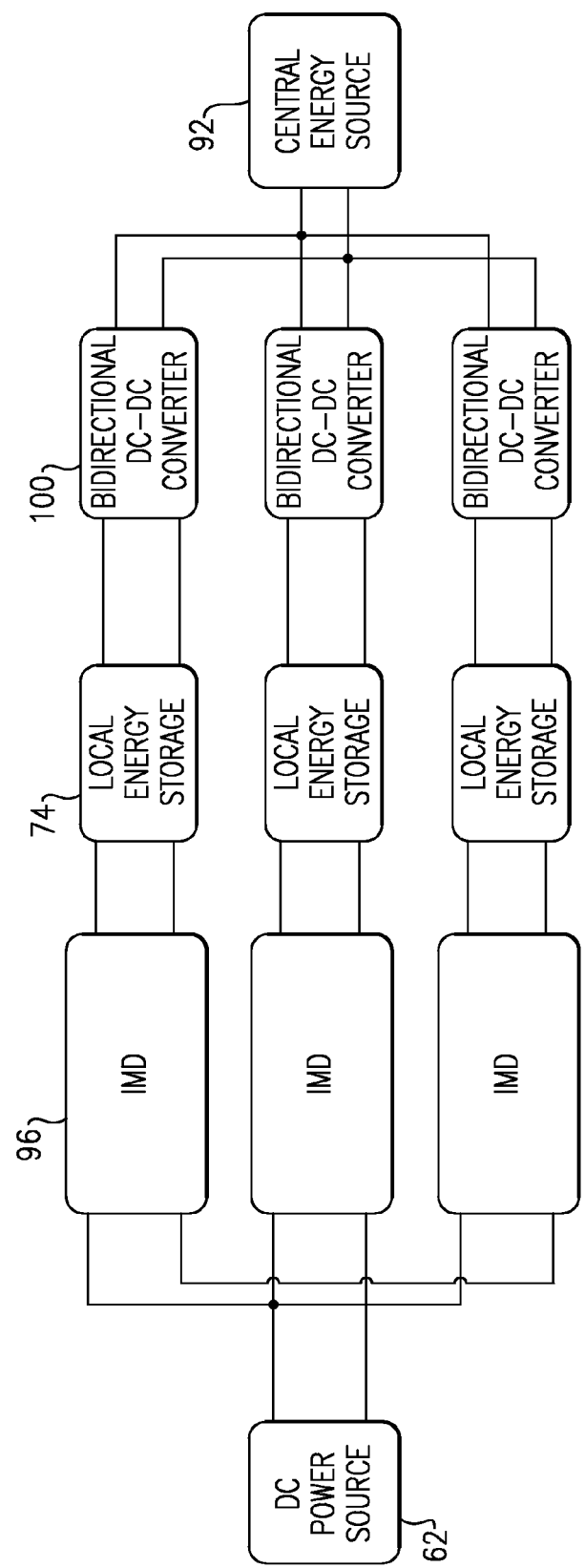
FIG. 11 shows overall system architecture.

As shown in FIG. 11, an overall system power architecture is disclosed. A DC power source 62 can provide power to any number of integrated motor drives 96. The integrated motor drives 96 drive motors, or alternatively store power at local energy storage components 74. The bi-directional DC to DC converters 100 then alternatively send that power to a central energy storage component 92. The system as shown in FIG. 11 allows efficient use of the power from the DC power source 62, to be used either to power motors, or to be stored at local energy storage components 74 and then eventually at central energy storage component 92.

While this embodiment has been mentioned as sending power from the local storage components to the central storage components, of course, the bi-directional nature of the converter would allow power to flow from the central storage component to the local storage components, as necessary. In this case, transistors 76 can be connected to the positive rail (not shown) to the right of the break line 72. This arrangement allows fault tolerant capability of the integrated motor drive. When the main power is no longer available, the local energy storage can supply electrical power to drive the motor. In this case, the transistors on the left of break line 72 need to be closed. While not specifically disclosed, a worker of ordinary skill in the art would understand how to provide an appropriate control to provide all of the control features disclosed across the 11 figures in this application.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. A machine comprising:
   a housing including a plurality of stator coils, said stator coils for being positioned adjacent to a rotor;
   a current source inverter including a switching network comprised of a plurality of diodes and switches, the switching network connected to said stator coils, and a pair of inductors positioned on DC power rails, a set of commutating capacitors, with said current source inverter and said stator coils all being positioned within said housing; and
   said machine alternates operation as a starter motor and a generator, the current source inverter operable during both starter motor and generator operation.

2. The machine as set forth in claim 1, wherein said set of commutating capacitors are connected to a line connecting said switching network and each of said stator coils.

3. The machine as set forth in claim 1, wherein an AC to DC converter is also positioned within said housing, and converts AC current to DC current when said machine is operating as a starter, and converts DC current from said stator coils into AC current when said machine is operating as a generator.

4. The machine as set forth in claim 1, wherein said machine is an integrated motor drive.

5. The machine as set forth in claim 4, wherein a three-phase modified diode bridge is positioned between said stator coils and a local energy storage component.

6. The machine as set forth in claim 4, wherein a storage switching network is positioned downstream of said stator coils, and said storage switching network being operable to alternate providing power from said stator coils to a motor rotor, or to alternatively send power to a local enemy storage component.

7. The machine as set forth in claim 6, wherein said local energy storage component is communicated to a central storage component.

8. The machine as set forth in claim 6, wherein a three-phase modified diode bridge is positioned between said stator coils and said local energy storage component.

9. A power architecture for a vehicle comprising:
   a source of DC power, said source of DC power communicating with a plurality of machines through integrated motor drives, each said integrated motor drive including a set of at least three coils positioned adjacent to rotors for a motor associated with each said integrated motor drive, and a storage switching network positioned downstream of each said set of coils, with said storage switching network being operable to be closed to allow power from said sets of coils to drive said rotors, or to be opened to allow power to no longer drive said rotors but instead pass to a local energy storage component.

10. The architecture as set forth in claim 9, wherein each said integrated motor drive comprises a housing including said coils, said coils positioned adjacent to said rotor, a current source inverter including a plurality of diodes and switches connected to said coils, a pair of inductors positioned on power rails, and a set of commutating capacitors and said coils all positioned within said housing.

11. The architecture as set forth in claim 10, wherein when said integrated motor drive is to drive said rotor, said switches being closed, and when said integrated motor drive is to supply power to said local energy storage component, said switches being open.

12. The architecture as set forth in claim 9, wherein a plurality of said local energy storage components supply stored energy to a central energy storage component.

13. The architecture as set forth in claim 12, wherein a bi-directional DC-DC converter is positioned between each of said local storage components and said central energy storage component.

14. The architecture as set forth in claim 13, wherein said bi-directional DC-DC converter includes a high frequency transformer.

15. The architecture as set forth in claim 14, wherein an AC power generation source generates AC power which passes through a rectifier, to be transferred into DC power, to supply said DC power source.

* * * * *